(12) United States Patent
Malinowski et al.

(10) Patent No.: US 7,142,655 B2
(45) Date of Patent: Nov. 28, 2006

(54) PLATFORM FOR RAPID DEVELOPMENT OF TELECOMMUNICATIONS SERVICES

(75) Inventors: Walter Martin Malinowski, Naperville, IL (US); Kimberly Price, Chicago, IL (US); Andrew Schmidt, Champaign, IL (US); Julia Skladman, Northbrook, IL (US); Barry James Sullivan, Long Grove, IL (US); Curt John Witte, Bannockburn, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 09/906,583

(22) Filed: Jul. 13, 2001
(Under 37 CFR 1.47)

(65) Prior Publication Data

US 2003/0063720 A1 Apr. 3, 2003

(51) Int. Cl.
*H04J 3/16* (2006.01)
(52) U.S. Cl. .............................. 379/201.03; 379/201.01
(58) Field of Classification Search ........... 379/201.03, 379/201.02, 201.05, 201.09, 201.12, 219, 379/220.01, 221.08, 221.11, 230
See application file for complete search history.

(56) References Cited

U.S. PATENT DOCUMENTS

| | | | |
|---|---|---|---|
| 5,241,588 A | | 8/1993 | Babson, III et al. |
| 5,541,986 A | | 7/1996 | Hou |
| 5,629,978 A | | 5/1997 | Blumhardt et al. |
| 5,701,419 A | * | 12/1997 | McConnell .................. 705/27 |
| 5,881,144 A | | 3/1999 | Havens |
| 6,178,438 B1 | * | 1/2001 | Tschirhart et al. .......... 709/200 |
| 6,393,481 B1 | * | 5/2002 | Deo et al. .................... 709/224 |
| 6,647,111 B1 | * | 11/2003 | Bjornberg et al. ...... 379/220.01 |
| 6,683,881 B1 | * | 1/2004 | Mijares et al. .............. 370/401 |
| 6,856,676 B1 | * | 2/2005 | Pirot et al. ............. 379/201.01 |
| 2001/0018711 A1 | * | 8/2001 | Morris |
| 2003/0012183 A1 | * | 1/2003 | Butler et al. |
| 2003/0185203 A1 | * | 10/2003 | Chow et al. |

OTHER PUBLICATIONS

Newton's Telecom Dictionary 1998, p. 335, Harry Newton.*
Article entitled *CPLANE* dated Aug. 6, 1999, Cplane, Inc.

* cited by examiner

*Primary Examiner*—William J. Deane, Jr.
(74) *Attorney, Agent, or Firm*—Brinks Hofer Gilson & Lione

(57) ABSTRACT

A system and method for creating and implementing telecommunications services are disclosed. The system comprises a service development platform that includes a communications module, and application server, and at least one auxiliary module. The communications module enables data to be transmitted to and from the development platform to facilitate the implementation of telecommunications services. The application server can store a telecommunications service creation tool that can be used by an individual to generate code needed to implement the telecommunications service or that can automatically generate code needed to implement the telecommunications service. The application server can also store the code needed to implement the telecommunications service and can transmit data to and receive data from the communications module as necessary for implementing the telecommunications service. The auxiliary module can perform various functions and can be accessed by the application server in implementing the telecommunications service.

25 Claims, 3 Drawing Sheets

PLATFORM FOR RAPID DEVELOPMENT OF TELECOMMUNICATIONS SERVICES

BACKGROUND

The present invention relates generally to telecommunications services and more particularly to the development and implementation of telecommunications services.

Various telecommunications services are commonly available to customers within a telecommunications system or network. Computer readable code is often used in conjunction with these telecommunications systems and networks to provide the telecommunications services to the customers. The computer readable code is typically used in conjunction with a network element, such as a switch or some other type of computer, and serves to provide a series of commands that enable the network element to perform the functions necessary to implement the telecommunications services. The network elements often utilize a specialized protocol, such as signaling system 7 (SS7) or a proprietary protocol, to communicate with one another, in order to implement a service.

The code used to implement the various services is typically developed by a programmer using software-based creation tools, which commonly include Service Independent Building Blocks (SIBBs), and a computer such as a personal computer. Such software-based creation tools are available from switch vendors such as Lucent Technologies and Nortel Networks. While creation tools facilitate the development of code needed to implement the service, their utility is limited in that the tools themselves, and in some cases the protocols used therein, are proprietary and are not open and published. Accordingly, only those with specialized knowledge of these tools and protocols can effectively create the code needed to implement new services. These individuals are typically employed by a hardware vendor or by a telecommunications company.

Also, multiple different protocols can be concurrently used within a single telecommunication system. Accordingly, the code used to implement the telecommunications services must be written so that it is compatible with all of the different protocols used within the telecommunications system. Thus, when a new service is introduced within a telecommunications system, multiple versions of the computer readable code used to implement the service must be created so that the service can be implement by the various elements within the network. In addition, when a new service is implemented, existing code that resides in different portions of the system may also require modification to work with the new service. For example, software used in conjunction with billing elements within the system may require modification in order to work with the new service. The creation of multiple versions of code needed to implement a new service as well as the modification of existing code to work in conjunction with the new service can be time consuming.

Before any code can be implemented in a telecommunications system, it must first be tested to ensure that it works as intended. Only after the testing has been completed can the code be implemented in the telecommunications system. Each of the different versions needed to work in conjunction with various types of hardware used by telecommunications providers must be individually tested. The testing of the various code versions and modifications is time consuming.

All of these inefficiencies increase the time needed to develop and implement a new telecommunications service. A system and method for developing telecommunications services that overcome these deficiencies are needed.

DETAILED DESCRIPTION OF THE PRESENTLY PREFERRED EMBODIMENTS

By way of introduction, the preferred embodiments described below include a method and system for creating and implementing a telecommunications service. In one embodiment, the system comprises a communications module, a server, and at least one auxiliary module. The communications module preferably receives and transmits data between a telecommunications network and the server. The server preferably comprises a telecommunications service creation tool that can be used to generate computer readable code for implementing telecommunications services. The server can store the code and can receive data from and transmit data to the communications module. One or more auxiliary modules can be coupled with the server. The auxiliary modules can comprise a voice recognition module, a billing module, a dual-tone multi-frequency (DTMF) signal receiver module, and a service management module, which can be coupled with the server to provide various capabilities. In a second embodiment, the system preferably comprises a server that includes a telecommunications service creation tool that can be used to automatically generate computer readable code for implementing telecommunications services in response to the receipt of certain data. These embodiments enable individuals, including telecommunications customers, to create and provision telecommunications services.

Figure 1:
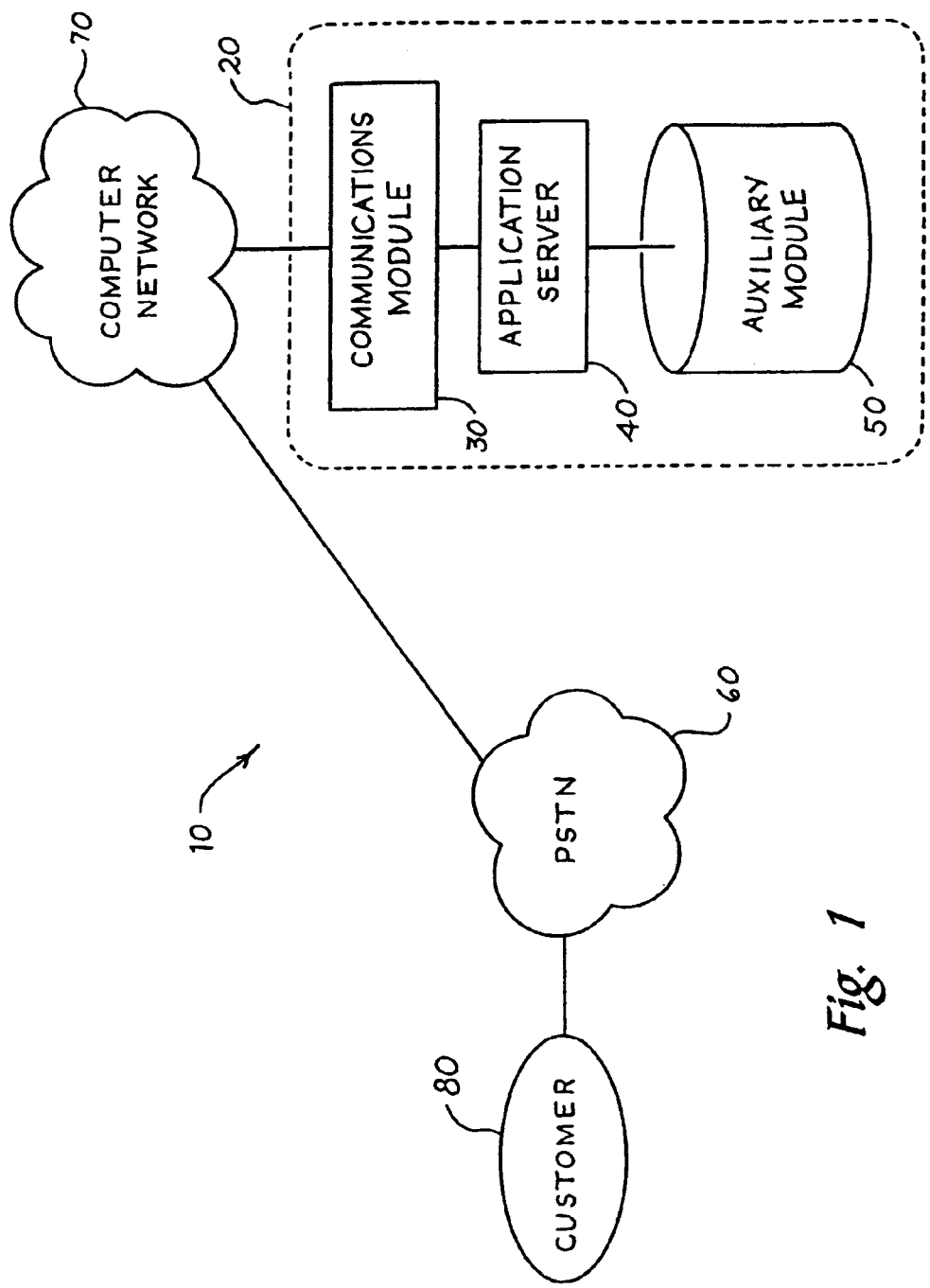
FIG. 1 is a block diagram of a telecommunications service development system of a preferred embodiment.

By way of example, FIG. 1 depicts a system 10 of a preferred embodiment. The system 10 comprises a development platform 20 that includes a communications module 30, an application server 40, and an auxiliary module 50. The development platform 20 can be coupled with a publicly switched telephone network (PSTN) 60 through the use of a computer network 70. The term "coupled with," as used herein, means directly coupled with or indirectly coupled with through one or more components. The development platform 20 can be used to create and implement telecommunications services that can provided to a customer station 80, which can be coupled with the PSTN 60. The term telecommunications services generally refers to services that can be made available to a customer that is utilizing a communication device, such as a telephone or computer, to communicate with the PSTN 60. Examples of telecommunications services include, but are not limited to, caller identification services, call waiting services, call screening services, voicemail services, messaging services, and services related to the delivery of information to the customer, such as billing information and usage information.

The communications module 30 preferably comprises a combination of hardware and software for receiving and transmitting data. The communications module 30 is preferably operable to receive data transmitted from the PSTN 60 and transmit data to the application server 40. The communications module 30 is also operable to receive data transmitted from the application server 40 and transmit the data to the PSTN 60. The communications module preferably comprises a router, but can also comprise any element that accomplishes a router-like function.

The application server 40 preferably comprises a Unix server, but can also comprise a Windows NT server or the like. The application server 40 preferably stores a telecommunications service creation tool for generating the computer code needed to implement a telecommunications service. The telecommunications service creation tool preferably comprises Service Independent Building Blocks (SIBBs) and related software applications that facilitate the development of code needed to implement various telecommunications services. Suitable telecommunications service creation tools are commercially available from Lucent and Nortel. An alternative telecommunications service creation tool can also comprise suitable building-blocks and related software applications. This alternative telecommunications service creation tool differs from those described above in that it is open and published so that it is publicly available and a greater number of individuals and companies have access to the tool. This enables a greater number of individuals and companies to create the computer code needed to implement different telecommunications services.

The application server 40 can also store and implement the computer code created using the telecommunications service creation tool. The application server 40 is preferably operative to receive data from and transmit data to the communications module 30 in accordance with a suitable computer protocol, such as TCP/IP, X.25, a client-server protocol, or the like. In one embodiment, the server 40 can be configured to automatically generate computer code in response to the receipt of data. For example, the server 40 can utilize the telecommunications service creation tool to automatically generate the computer code needed to implement a telecommunications service in response to the receipt of a proper command from the customer station 80 or from another user. The application server 40 can comprise a single server or a plurality of servers.

One or more auxiliary application modules 50 can be coupled with the application server 40. The auxiliary application module 50 can comprise, for example, a voice recognition module, a billing module, a dual-tone multi-frequency (DTMF) signal receiver module, a service management module, or the like. The auxiliary application module 50 preferably comprises a combination of hardware and software that can be accessed by the application server 40 and can perform various functions, as described in more detail below.

The PSTN 60 preferably comprises a networked collection of telecommunications components. The PSTN 60 can include advanced intelligent network (AIN) components as well as non-AIN components. For example, the PSTN 60 can include one or more of the following network elements: a service switching point (SSP), a signal transfer point (STP), a service control point (SCP), a database, a service node (SN), an intelligent peripheral (IP), as well as other switches and components, such as non-AIN components, as known to those skilled in the art. The communication module 30, application server 40, and auxiliary application modules 50 are implemented on computers or equivalent hardware that separate and apart from the computers or equivalent hardware that is used to implement the network elements of the PSTN 60. Accordingly, the communication module 30, application server 40, and auxiliary application modules 50 are independent from the PSTN 60.

The network 70 preferably comprises a computer network, such as the Internet, but can comprises any other network that is operative to transmit data, such as a local area network or a wide area network. The network 70 is preferably coupled with the PSTN 60 and enables data to be transmitted between the development platform 20 and the PSTN 60. The network 70 can comprise a single network or a plurality of networks.

The system of FIG. 1 can be used to create and implement a telecommunication service, such as a telephone service, as described below. A user can access the telecommunications service creation tool stored on the application server 40 to create computer code needed to implement a new telecommunications service. In this example, the user can be a software developer or a telecommunications customer. In the case of a software developer, they can have direct or remote access to the development platform 20 and can create the code needed to implement the telecommunications service. The code can be created from scratch or, preferably, through the use of the telecommunications service creation tools described herein. The resulting code serves as a series of commands that facilitate the implementation of a telecommunications service, which can be utilized by various telecommunications customers that can have access to the system.

A customer at the customer station 80 can also create the code needed to implement a telecommunications service. The customer can access the development platform 20 to create or provision services for their telephone or telephone line. For example, the customer could use a communication device, such as an analog telephone set, a wireless communication device, a cellular communication device, a PCS communication device, an ISDN communication device, or any other form of communication device, to access the development platform 20 to implement, modify, or cancel a telecommunication service. The customer could access the development platform 20, for example, by dialing a number that would cause the PSTN 60 to route the call to the development platform 20.

Once the customer is connected with the development platform 20, the customer could enter a password or pin number that would enable the customer to alter the data stored at the development platform 20 or create new data, such that a new telecommunication service could be created, a new telecommunication service could be implemented, an existing telecommunication service could be altered, or an existing telecommunication service could be canceled. Announcements could be generated by and transmitted from the development platform 20 to facilitate the creation and provisioning of services. For example, the announcements could comprise audible or text prompts that the customer can respond to by transmitting DTMF signals, voice commands, or some other form of input. In response to the input provided by the customer, the development platform 20 can perform a predefined action, including the automatic generation of the code needed to implement the telecommunications service.

Alternatively, the customer could use a computer, such as a personal computer or the like, to access the development platform 20 to create or provision services. The customer can establish communication between the computer and the development platform 20 through known dial-up and networking techniques. Once the appropriate communication has been established, the customer can create, activate, modify, or cancel services, as discussed herein. For example, the customer could create the code needed to implement a telecommunications service by utilizing the telecommunications service creation tool. The customer could also provision various functions associated with their billing statements that result from their use of the telecommunications network and services. The customer can choose to have a bill generated in an electronic format and transmitted electronically to them at the customer station 80. The bill can be transmitted from the development platform 20 to a computer via the computer network 70 and the PSTN 60 using commonly know transmissions systems and techniques such as electronic mail or email. Other types of provisioning can also be accomplished by the customer as discussed herein.

Once the code has been developed, it can be stored on and tested by the application server 40. The code can also be implemented on the application server 40 and the auxiliary module 50 can be utilized to perform various functions. For example, a voice recognition module or a DTMF signal receiver module can be used to receive instructions from a customer that can be used to create, implement or alter the implementation of a telecommunications service.

The telecommunications service can be utilized by a calling party or a called party that is connected to the PSTN 60. For example, the service can be activated in response to a query that is triggered by one of the network elements of PSTN 60, such as the calling party's central office switch or the called party's central office switch. The query is preferably generated to request that a certain function be performed by the development platform 20 or to request that certain data be returned from the development platform 20. The query can be transmitted from the PSTN 60 to the development platform 20 via the computer network 70.

The communications module 30 can receive the query from the computer network 70 and can transmit the query to the appropriate location within the development platform 20. For example, if multiple servers exist within the development platform 20, the communications module 30 can route the query to the appropriate application server. The query can cause the computer code stored in the application server 40 to be activated, as needed, to implement a telecommunication service. The application server 40 can access the auxiliary module 50, as needed, to implement the telecommunication service. If it is necessary to transmit data between the application server 40 and the PSTN 60 in order to implement the telecommunication service, the data can be sent bi-directionally through the communications module 30, the computer network 70, and the PSTN 60.

Figure 2:
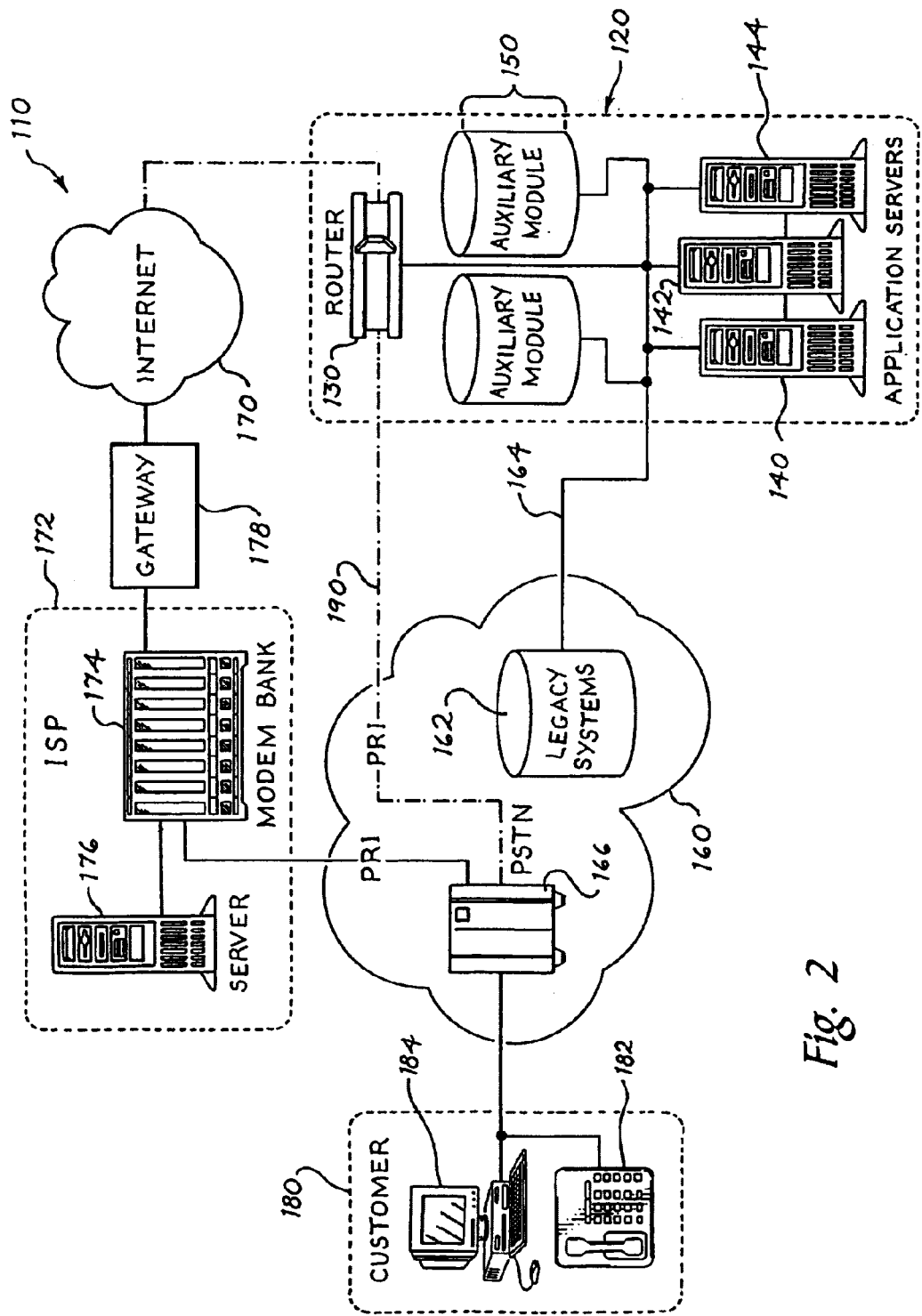
FIG. 2 is a block diagram of a first preferred embodiment of the telecommunications service development system of FIG. 1.

Referring now to FIG. 2, a preferred embodiment of the system depicted in FIG. 1 is shown. The system 110 comprises a development platform 120 for developing and implementing telecommunications services that can be provided to a customer at the customer station 180. The customer station 180 can comprise a telephone 182 and/or a computer 184. The telephone 182 can comprise an analog telephone set, wireless, PCS, ISDN, or any other form of communication device. The computer 184 can comprise any suitable computer such as a personal computer, a desktop computer; a portable computer, a palm computer, a personal digital assistant or organizer, or the like.

The development platform, preferably comprises a router 130, a plurality of application servers 140, 142, 144, and a plurality of auxiliary modules 150. The router 130 serves as a communication module and is operative to receive, route, and transmit data. The router 130 can comprise any suitable router, such as Cisco 75xx routers available from Cisco Systems, Inc.

The application servers 140, 142, 144 are operative to store a telecommunications service creation tool for generating the computer code needed to implement a telephone service. The telecommunications service creation tool preferably implements SIBB or other building-block technology, as discussed herein. The telecommunications service creation tool enables code to be developed that can operate in accordance with standard computer protocols. The application servers 140, 142, 144 can also store and implement the computer code, that was created using the telecommunications service creation tool, as described in more detail below. The application servers 140, 142, 144 are preferably operative to receive data from and transmit data to the router 130 in accordance with the TCP/IP protocol. Suitable application servers are available from Sun Microsystems, Inc. The application servers 140, 142, 144 can also access the auxiliary modules 150 to perform various functions needed to implement and provide telecommunications services to the customer, as described in more detail below.

Figure 3:
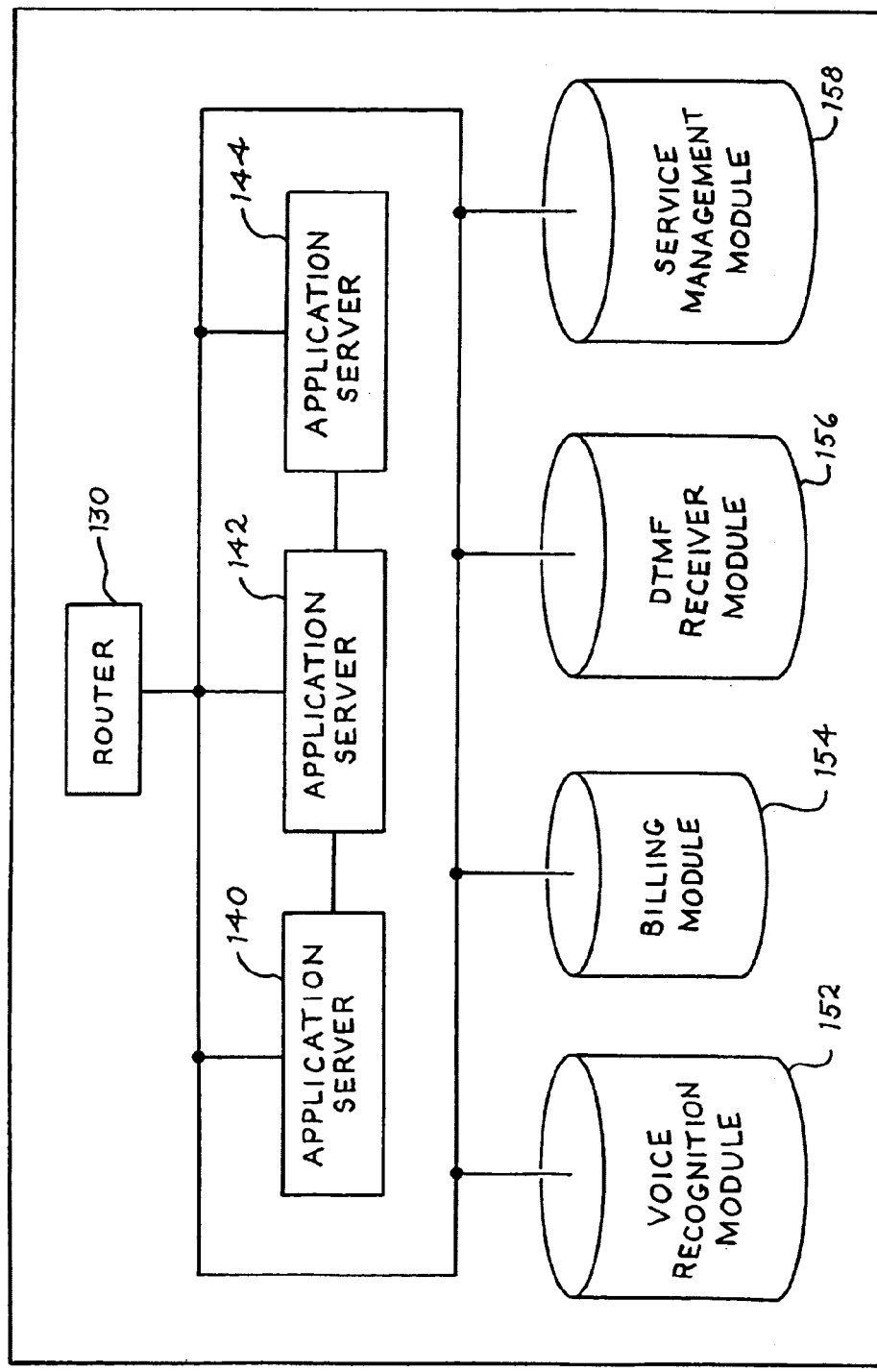
FIG. 3. is more detailed block diagram a portion of the telecommunications service development system of FIG. 2.

The auxiliary modules 150 preferably comprise a voice recognition module 152, a billing module 154, a DTMF signal receiver module 156, and a service management module 158, as shown in FIG. 3. The voice recognition module 152 preferably comprises a combination of hardware and software that is preferably operative to receive voice signals, interpret the voice signals, and perform specified operations in response to the voice signals. One suitable voice recognition module is the Lucy System available from Lucent.

The billing module 154 preferably comprises a combination of hardware and software that is preferably operative to track usage by customers and generate a bill corresponding to a customer's use. One suitable billing module is the type used to process transactions paid for with a credit card, such as those available from various banking institutions. In one embodiment, the billing module 154 can track a customer's use of the system in general or of specific services and can transmit a bill reflecting such usage to the customer. The bill can be transmitted via the application servers 140, 142, 144, the router 130, the Internet 170, and the PSTN 160 and can be received at a user's computer 184. Other suitable auxiliary modules include text-to-speech modules and messaging platforms.

In an alternative embodiment, the development platform 120 can be coupled with a billing system 162 that resides in the PSTN 160. The billing system 162 can comprise a legacy billing system as known to those skilled in the art. The development platform 120 and the billing system 162 can be coupled via a link 164, such as a TCP/IP link.

The DTMF signal receiver module 156 preferably comprises a combination of hardware and software that is preferably operative to receive DTMF signals, interpret the DTMF signals, and perform specified operations in response to the DTMF signals. DTMF signal receiver modules commonly exist today as port of a class 5 signal switching point provided by vendors such as Nortel and Lucent, but can also comprise a stand alone module.

The service management module 158 preferably comprises a combination of hardware and software that is preferably operative to provision order requests. The service management module 158 is preferably operative to store information about various telecommunications services and receive information from and transmit information to different elements within the system 110 to facilitate the provisioning of order requests. One suitable service management module is the enhanced Service Management system (eSM) available from Lucent.

The PSTN 160 preferably comprises at least one AIN switch 166, such as a such as an SSP. One suitable switch is a class 5 switch available from Ericsson, Nortel, Lucent, and Siemens. The switch 166 enables the user to access the PSTN 160 as well as the development platform 120 through the use of a telephone 182 or a computer 184.

The development platform 120 is coupled with the Internet 170, to facilitate the transmission of data between the development platform 120 and the PSTN 160 and, ultimately, the customer station 180. An internet service provider (ISP) 172, is preferably used to provide a connection between the PSTN 160 and the Internet 170. The ISP 172 preferably comprises a modem 174 and can also comprise a server 176.

A telephony gateway 178 is preferably disposed between the PSTN 160 and the Internet 170. The gateway 178 is preferably operable to receive, translate, and transmit data. For example, the gateway 178 can receive data from the PSTN 160 in accordance with a first protocol, translate the data into a second format in accordance with a second protocol, and transmit the data to the Internet 170. In one example, data can be transmitted from the PSTN 160 in accordance with a telecommunications protocol, such as signaling system 7 (SS7). The gateway 178 can receive that data and translate the data from the SS7 format to computer format such as TCP/IP. The gateway 178 can then transmit the data in accordance with the TCP/IP format to the Internet 170. In an alternative embodiment, the functions of the gateway 178 can be incorporated into the server 176 contained within the ISP 172. In this example, the gateway 178 would not be necessary as a separate component.

In a further alternative embodiment, the development platform 120 can be coupled with the PSTN 160 through the use of a primary rate interface (PRI) 190, or the like. This could provide a direct connection between, for example, the router 130 and the switch 166. In this data could be transmitted between the development platform 120 and the PSTN 160 over the PRI 190 instead of using the Internet 170.

It should be understood that multiple switches or other telecommunications network components from various networks can access the code for implementing a telecommunications service, which is stored on the development platform 20, 120. In addition, multiple development platforms 20, 120 can be used to implement telecommunications services.

The system of FIGS. 2–3 can be used to create and implement a telecommunications service as described below. A user can access the creation tools stored on one or more of the application servers 140, 142, 144 to create computer code needed to implement a new telecommunications service. This code can be created in accordance with a computer protocol, such as TCP/IP or the like. Once completed, the code can be stored on and tested by one or more of the application servers 140, 142, 144. The code can also be implemented on one or more of the application servers 140, 142, 144 and can utilize the auxiliary modules 150 to perform various functions. For example, a voice recognition module 152 or a DTMF signal receiver module 156 can be used to receive instructions from a customer that can be used to implement or alter the implementation of a telecommunications service.

In addition, a customer can access the development platform 120 to create and provision telecommunications services for their telephone line, as discussed above. For example, the customer could use the telephone 182 or the computer 184 to transmit data to the development platform. The data can be transmitted from the telephone 182 in the form of DTMF tones or voice data. Alternatively, the data can be transmitted from the computer 184 in accordance with any suitable protocol. The transmission of data can enable the customer to create and provision services, as well as to control billing features, as described above.

The telecommunications service can be utilized by a calling party or a called party that is connected to the PSTN 160. For example, the telecommunications service can be activated in response to a query that is triggered by one of the network elements of PSTN 160, such as the calling party's central office switch or the called party's central office switch. The query is preferably created in accordance with the SS7 protocol and can be transmitted from the PSTN 160 to the gateway 178, via the ISP 172. The gateway 178 can translate the query from the SS7 format to an IP format and can transmit the query to the development platform 120 via the Internet 170. The router 130 can transmit the query to the appropriate location within the development platform 120. For example, the router 130 can route the query to the appropriate application server. The query can activate a program in one or more of the application servers 140, 142, 144 as necessary to implement the telecommunications service. One or more of the application servers 140, 142, 144 can access one or more of the auxiliary modules 150, to implement the telecommunications service. If it is necessary to transmit data between the application servers 140, 142, 144 and the PSTN 160, the data can be sent bi-directionally through the router 130, the Internet 170, and the gateway 176.

The foregoing systems and methods utilize a combination of preexisting hardware and software to enable rapid development and implementation of telecommunications services. Also, since the hardware and software are located at a central location that is separate from a PSTN yet accessible by multiple PSTNs, new telecommunications services can be implement across many PSTNs without having to be individually installed within each PSTN. In addition, the foregoing systems and methods facilitate the development of the computer code needed to implement telecommunications services through the use of telecommunications service creation tools. The telecommunications service creation tools enable an individual, such as a software programmer, to create the needed code. The telecommunications service creation tools also enable the needed to code to be automatically generated. Thus, a larger group of individuals, including telecommunications customers, can develop telecommunications services.

It is to be understood that a wide range of changes and modifications to the embodiments described above will be apparent to those skilled In the art and are contemplated. It is therefore intended that the foregoing detailed description be regarded as illustrative rather than limiting, and that it be understood that it is the following claims, including all equivalents, that are intended to define the spirit and scope of the invention.

We claim:

1. A system for creating a new telecommunications service, the system comprising:

a gateway coupled with a telephone network, the gateway being operative to receive data in a first format, translate the data into a second format, and transmit the data in the second format;

a communication module coupled with the gateway, the communication module being operative to receive the data in the second format;

a server coupled with the communication module, the server storing a telecommunications service creation tool; and at least one auxiliary module coupled with the server, the at least one auxiliary module being selected from the group consisting of: a voice recognition module, a billing module, a dual-tone multi-frequency (DTMF) signal receiver module, and a service management module;

wherein the communication module, the server, and the at least one auxiliary module are independent from the telephone network, wherein the telecommunications service creation tool is operative to:

provide access to a customer at a remotely-located computer, wherein the customer is other than an employee of a telecommunications company running the telephone network;

receive information from the remotely-located computer regarding a new telecommunications service that the customer wants to develop; and based on the received information, automatically generate computer code comprising a plurality of commands that implement the new telecommunication service;

whereby the customer can develop the new telecommunications service by interacting with the telecommunications service creation tool.

2. The invention of claim 1, wherein the communication module comprises a router.

3. The invention of claim 1, wherein a computer network is disposed between the communication module and the gateway.

4. The invention of claim 3, wherein the computer network comprises the internet.

5. The invention of claim 1, wherein the telecommunications service creation tool comprises a service independent building block.

6. The invention of claim 1, wherein the telecommunications service creation tool is open and published.

7. The invention of claim 1, further comprising a remote personal computer coupled with the communication module.

8. The invention of claim 1, further comprising a telephone coupled with the communication module.

9. The system of claim 1, wherein the gateway is operative to translate data from a SS7 protocol to a TCP/IP protocol.

10. A system for creating a new telecommunications service, the system comprising:

a gateway coupled with a telephone network, the gateway being operative to receive data in a first format, translate the data into a second format, and transmit the data in the second format; and a server storing a telecommunications service creation tool that is coupled with the gateway, the server being operative to receive data in the second format and being operative to automatically generate computer code in response to the receipt of the data, wherein the computer code is utilized by the server to implement the new telecommunications service, wherein the telecommunications service creation tool is operative to:

provide access to a customer at a remotely-located computer, wherein the customer is other than an employee of a telecommunications company running the telephone network;

receive information from the remotely-located computer regarding a new telecommunications service that the customer wants to develop; and based on the received information, automatically generate computer code comprising a plurality of commands that implement the new telecommunication service;

whereby the customer can develop the new telecommunications service by interacting with the telecommunications service creation tool.

11. The system of claim 10, wherein the gateway is operative to translate data from a SS7 protocol to a TCP/IP protocol.

12. The system of claim 10, further comprising at least one auxiliary module coupled with the server, the at least one auxiliary module being selected from the group consisting of: a voice recognition module, a billing module, a dual-tone multi-frequency (DTMF) signal receiver module, and a service management module.

13. The invention of claim 10, wherein a computer network is disposed between the gateway and the server.

14. The invention of claim 13, wherein the computer network comprises the Internet.

15. The invention of claim 10, wherein the telecommunications service creation tool comprises a service independent building block.

16. The invention of claim 10, wherein the telecommunications service creation tool is open and published.

17. A method of creating a new telecommunication service for use on a telephone network run by a telecommunications company, the method comprising:

(a) receiving data transmitted by a customer, wherein the customer is other than an employee of the telecommunications company and wherein the data provides an indication of the customer's desire to create the new telecommunication service; and (b) with a telecommunications service creation tool, automatically generating computer code comprising a plurality of commands that implement the new telecommunication service, whereby the customer can develop the new telecommunications service by interacting with the telecommunications service creation tool.

18. The method of claim 17, wherein (a) comprises receiving data transmitted from a telephone.

19. The method of claim 17, wherein (a) comprises receiving data transmitted from a computer.

20. The method of claim 17, wherein (a) comprises receiving data transmitted via a computer network.

21. The method of claim 17, wherein (a) comprises receiving data transmitted via the Internet.

22. The method of claim 17, wherein (a) comprises receiving data transmitted via a telecommunications network.

23. The method of claim 17, wherein (b) comprises utilizing a service independent building block to automatically generate the computer code in response to the receipt of the data.

24. The method of claim 17, further comprising:

(c) accessing the computer code in response to the receipt of a predefined query.

25. The method of claim 24, further comprising generating a billing record in response to (c).

* * * * *